United States Patent
Barghi et al.

(10) Patent No.: US 10,516,618 B2
(45) Date of Patent: Dec. 24, 2019

(54) PREAMBLE DESIGN ON A SHARED COMMUNICATION MEDIUM

(71) Applicant: QUALCOMM Incorporated, San Diego, CA (US)

(72) Inventors: Sanaz Barghi, Carlsbad, CA (US); Mohammad Naghshvar, San Diego, CA (US); Chirag Sureshbhai Patel, San Diego, CA (US); Ahmed Kamel Sadek, San Diego, CA (US); Tamer Adel Kadous, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 85 days.

(21) Appl. No.: 15/615,831

(22) Filed: Jun. 6, 2017

(65) Prior Publication Data

US 2017/0359263 A1     Dec. 14, 2017

Related U.S. Application Data

(60) Provisional application No. 62/348,703, filed on Jun. 10, 2016.

(51) Int. Cl.
    *H04L 12/851*     (2013.01)
    *H04B 17/309*     (2015.01)
    (Continued)

(52) U.S. Cl.
    CPC ....... *H04L 47/2433* (2013.01); *H04B 17/309* (2015.01); *H04L 5/0048* (2013.01);
    (Continued)

(58) Field of Classification Search
None
See application file for complete search history.

(56) References Cited

U.S. PATENT DOCUMENTS

| | | | |
|---|---|---|---|
| 2012/0083282 A1* | 4/2012 | Choi | H04B 7/022 455/449 |
| 2015/0117366 A1* | 4/2015 | Stupar | H04W 24/10 370/329 |
| 2015/0173070 A1* | 6/2015 | Aboul-Magd | H04L 5/0007 370/329 |

FOREIGN PATENT DOCUMENTS

| | | |
|---|---|---|
| WO | 2008052194 A2 | 5/2008 |
| WO | 2016070114 A1 | 5/2016 |

OTHER PUBLICATIONS

Choi J.I., et al., "Granting Silence to Avoid Wireless Collisions", 18th IEEE International Conference on Network Protocols (ICNP), Oct. 5, 2010, XP031864717, DOI: 10.11 09/ICNP.201 0.5762757, ISBN: 978-1-4244-8644-1, pp. 82-91.

(Continued)

*Primary Examiner* — Ajit Patel
*Assistant Examiner* — Richard Schnell
(74) *Attorney, Agent, or Firm* — MG-IP Law, P.C.

(57) ABSTRACT

Techniques for managing preamble transmission and processing on a shared communication medium are disclosed. An access point or an access terminal, for example, may generate a preamble for silencing communication on a communication medium with respect to an upcoming data transmission, configure the preamble to identify one or more target devices for the silencing, and transmit the preamble over the communication medium in advance of the data transmission. Conversely, the access point or the access terminal may receive a preamble (as a receiving device) over a communication medium, identify one or more target devices for silencing communication on the communication medium with respect to an upcoming data transmission based on the preamble, and selectively silence communication over the communication medium based on itself (as the (Continued)

receiving device) being among the one or more target devices.

24 Claims, 11 Drawing Sheets

(51) Int. Cl.
    *H04L 5/00*          (2006.01)
    *H04L 29/06*        (2006.01)
    *H04L 12/853*      (2013.01)
    *H04W 74/00*      (2009.01)

(52) U.S. Cl.
    CPC .......... *H04L 29/06* (2013.01); *H04L 47/2416* (2013.01); *H04W 74/006* (2013.01)

(56) References Cited

OTHER PUBLICATIONS

"International Search Report and Written Opinion—PCT/US2017/036386—ISA/EPO—dated Sep. 13, 2017".

\* cited by examiner

PREAMBLE DESIGN ON A SHARED COMMUNICATION MEDIUM

CROSS-REFERENCE TO RELATED APPLICATIONS

The present application claims the benefit of U.S. Provisional Application No. 62/348,703, entitled "Preamble Design on a Shared Communication Medium," filed Jun. 10, 2016, assigned to the assignee hereof and expressly incorporated herein by reference in its entirety.

BACKGROUND

Aspects of this disclosure relate generally to telecommunications, and more particularly to operations on a shared communication medium and the like.

Wireless communication systems are widely deployed to provide various types of communication content, such as voice, data, multimedia, and so on. Typical wireless communication systems are multiple-access systems capable of supporting communication with multiple users by sharing available system resources (e.g., bandwidth, transmit power, etc.). Examples of such multiple-access systems include Code Division Multiple Access (CDMA) systems, Time Division Multiple Access (TDMA) systems, Frequency Division Multiple Access (FDMA) systems, Orthogonal Frequency Division Multiple Access (OFDMA) systems, and others. These systems are often deployed in conformity with specifications such as Long Term Evolution (LTE) provided by the Third Generation Partnership Project (3GPP), Ultra Mobile Broadband (UMB) and Evolution Data Optimized (EV-DO) provided by the Third Generation Partnership Project 2 (3GPP2), 802.11 provided by the Institute of Electrical and Electronics Engineers (IEEE), etc.

In cellular networks, "macro cell" access points provide connectivity and coverage to a large number of users over a certain geographical area. A macro network deployment is carefully planned, designed, and implemented to offer good coverage over the geographical region. To improve indoor or other specific geographic coverage, such as for residential homes and office buildings, additional "small cell," typically low-power access points have recently begun to be deployed to supplement conventional macro networks. Small cell access points may also provide incremental capacity growth, richer user experience, and so on.

Small cell LTE operations, for example, have been extended into the unlicensed frequency spectrum such as the Unlicensed National Information Infrastructure (U-NII) band used by Wireless Local Area Network (WLAN) technologies. This extension of small cell LTE operation is designed to increase spectral efficiency and hence capacity of the LTE system. However, it may also encroach on the operations of other Radio Access Technologies (RATs) that typically utilize the same unlicensed bands, most notably IEEE 802.11x WLAN technologies generally referred to as "Wi-Fi."

SUMMARY

Techniques for managing preamble transmission and processing on a shared communication medium are disclosed.

In one example, a communication method is disclosed. The method may include, for example, generating a preamble for silencing communication on a communication medium with respect to an upcoming data transmission; configuring the preamble to identify one or more target devices for the silencing; and transmitting the preamble over the communication medium in advance of the data transmission.

In another example, a communication apparatus is disclosed. The apparatus may include, for example, at least one processor, at least one memory coupled to the at least one processor, and at least one transceiver. The at least one processor and the at least one memory may be configured to generate a preamble for silencing communication on a communication medium with respect to an upcoming data transmission and to configure the preamble to identify one or more target devices for the silencing. The at least one transceiver may be configured to transmit the preamble over the communication medium in advance of the data transmission.

In another example, another communication apparatus is disclosed. The apparatus may include, for example, means for generating a preamble for silencing communication on a communication medium with respect to an upcoming data transmission; means for configuring the preamble to identify one or more target devices for the silencing; and means for transmitting the preamble over the communication medium in advance of the data transmission.

In another example, a transitory or non-transitory computer-readable medium is disclosed, which, when executed by at least one processor, causes the at least one processor to perform operations for communication. The computer-readable medium may include, for example, code for generating a preamble for silencing communication on a communication medium with respect to an upcoming data transmission; code for configuring the preamble to identify one or more target devices for the silencing; and code for transmitting the preamble over the communication medium in advance of the data transmission.

In another example, another communication method is disclosed. The method may include, for example, receiving a preamble at a receiving device over a communication medium; identifying one or more target devices for silencing communication on the communication medium with respect to an upcoming data transmission based on the preamble; and selectively silencing communication over the communication medium based on the receiving device being among the one or more target devices.

In another example, another communication apparatus is disclosed. The apparatus may include, for example, at least one processor, at least one memory coupled to the at least one processor, and at least one transceiver. The at least one transceiver may be configured to receive a preamble at a receiving device over a communication medium. The at least one processor and the at least one memory may be configured to identify one or more target devices for silencing communication on the communication medium with respect to an upcoming data transmission based on the preamble and to selectively silence communication over the communication medium based on the receiving device being among the one or more target devices.

In another example, another communication apparatus is disclosed. The apparatus may include, for example, means for receiving a preamble at a receiving device over a communication medium; means for identifying one or more target devices for silencing communication on the communication medium with respect to an upcoming data transmission based on the preamble; and means for selectively silencing communication over the communication medium based on the receiving device being among the one or more target devices.

In another example, another transitory or non-transitory computer-readable medium is disclosed, which, when executed by at least one processor, causes the at least one processor to perform operations for communication. The computer-readable medium may include, for example, code for receiving a preamble at a receiving device over a communication medium; code for identifying one or more target devices for silencing communication on the communication medium with respect to an upcoming data transmission based on the preamble; and code for selectively silencing communication over the communication medium based on the receiving device being among the one or more target devices.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
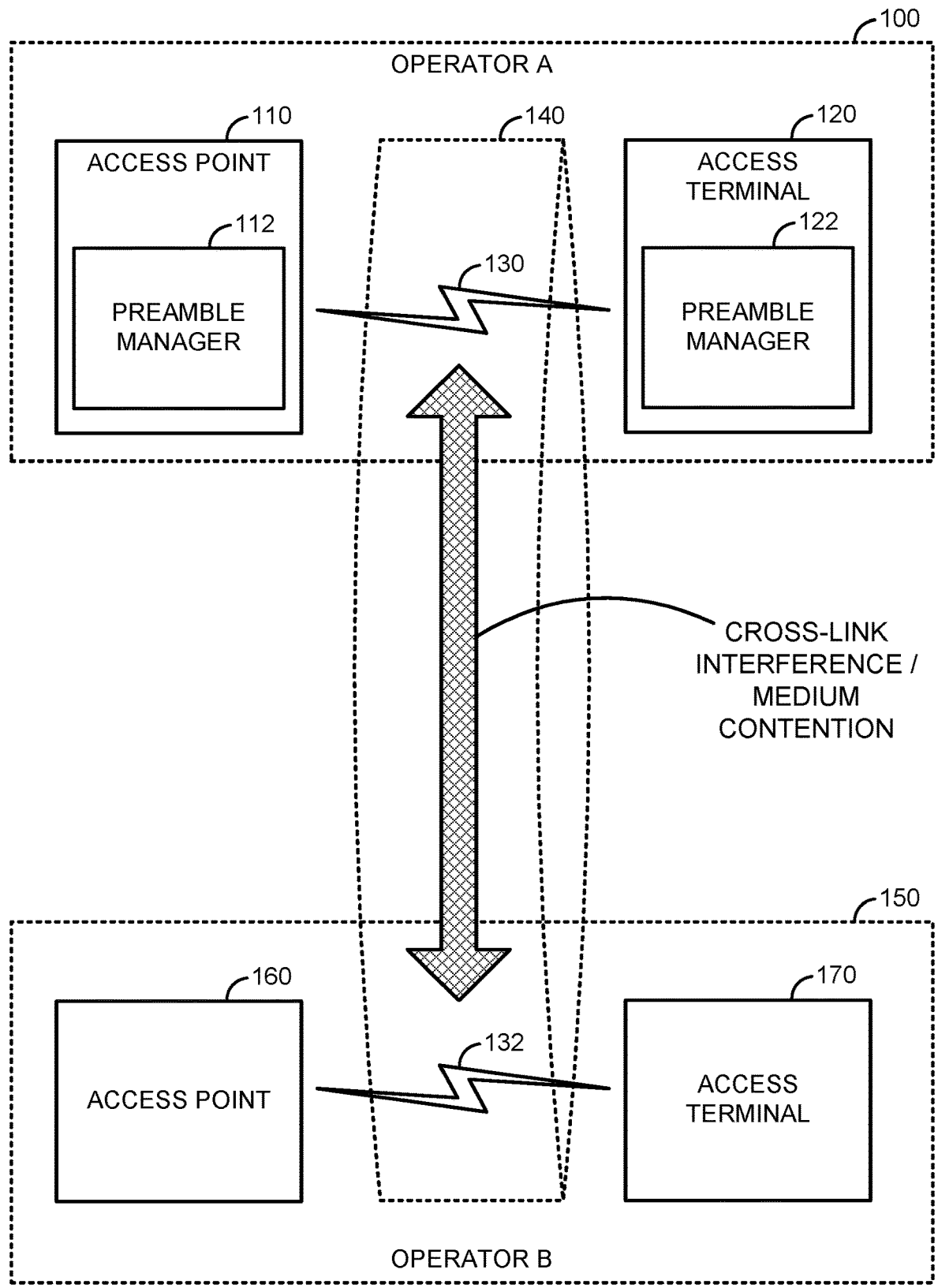
FIG. 1 is a system-level diagram illustrating an example wireless network environment.

The present disclosure relates generally to a "directed" preamble design on a shared communication medium. Small cell operations have been extended into so-called "unlicensed" and "lightly licensed" frequency spectra, for example, such as the Unlicensed National Information Infrastructure (U-NII) band and the Citizens Broadband (CB) Radio Service band. This extension of small cell operation is designed to increase spectral efficiency and hence overall system capacity. However, it may also lead to varying degrees of interference between small cell access points and operators as their devices compete for access to shared resources.

In order to manage the interference between nodes operating within a shared communication medium, various silencing techniques may be employed, including energy detection and/or preamble detection. Some conventional silencing techniques, however, may result in sub-optimal silencing of neighboring devices (e.g., over-silencing or under-silencing) and inefficient resources reuse. To better ensure appropriate silencing of neighboring devices, the directed preamble may be configured to include one or more silencing criteria, such as a device identifier, a protected device identity and associated interference level tolerance threshold, and so on, that explicitly or implicitly identifies one or more target devices for silencing. In contrast to conventional preamble designs that silence all neighboring devices able to decode the preamble, such a directed preamble allows more selective targeting of interfering devices, thereby providing more efficient resource reuse. In addition, the directed preamble and associated processing may be configured for detection and decoding at substantially lower signal-to-noise ratios (SNRs) to address the hidden node problem also associated with conventional preamble designs, without unduly silencing even more neighboring devices.

More specific aspects of the disclosure are provided in the following description and related drawings directed to various examples provided for illustration purposes. Alternate aspects may be devised without departing from the scope of the disclosure. Additionally, well-known aspects of the disclosure may not be described in detail or may be omitted so as not to obscure more relevant details.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., Application Specific Integrated Circuits (ASICs)), by program instructions being executed by one or more processors, or by a combination of both. In addition, for each of the aspects described herein, the corresponding form of any such aspect may be implemented as, for example, "logic configured to" perform the described action.

FIG. 1 is a system-level diagram illustrating an example wireless network environment, shown by way of example as including systems from two operators, a first operator A system 100 and a second operator B system 150. Each system may be composed of different wireless nodes generally capable of receiving and/or transmitting over a wireless link, including information related to various types of communication (e.g., voice, data, multimedia services, associated control signaling, etc.). The operator A system 100 is shown as including an access point 110 and an access terminal 120 in communication with each other over a wireless link 130. The operator B system 150 is shown as including its own access point 160 and access terminal 170 in communication with each other over a separate wireless link 132.

As an example, the access point 110 and the access terminal 120 of the operator A system 100 may communicate via the wireless link 130 in accordance with a Long Term Evolution (LTE) technology or a variant thereof (e.g., MuLTEfire, Licensed Assisted Access (LAA), etc.), while the access point 160 and the access terminal 170 of the operator B system 150 may communicate via the wireless link 132 in accordance with the same LTE technology or a different technology (e.g., Wi-Fi technology) but be deployed by a different operator (e.g., a different company or other entity controlling authorization, system timing, etc.). It will be appreciated that each system may support any number of wireless nodes (access points, access terminals, etc.) distributed throughout a geographic region, with the illustrated entities being shown for illustration purposes only. Instead of LTE technology, persons skilled in the art will appreciate that communications via wireless links 130 and 132 may be configured in accordance with a fifth generation (5G)/new radio (NR) technology or a variant thereof, among others.

Unless otherwise noted, the terms "access terminal" and "access point" are not intended to be specific or limited to any particular Radio Access Technology (RAT). In general, access terminals may be any wireless communication device allowing a user to communicate over a communications network (e.g., a mobile phone, router, personal computer, server, entertainment device, Internet of Things (IOT)/Internet of Everything (IOE) capable device, in-vehicle communication device, etc.), and may be alternatively referred to in different RAT environments as a User Device (UD), a Mobile Station (MS), a Subscriber Station (STA), a User Equipment (UE), etc. Similarly, an access point may operate according to one or several RATs in communicating with access terminals depending on the network in which the access point is deployed, and may be alternatively referred to as a Base Station (BS), a Network Node, a NodeB, an evolved NodeB (eNB), etc. Such an access point may correspond to a small cell access point, for example. "Small cells" generally refer to a class of low-powered access points that may include or be otherwise referred to as femto cells, pico cells, micro cells, Wireless Local Area Network (WLAN) access points, other small coverage area access points, etc. Small cells may be deployed to supplement macro cell coverage, which may cover a few blocks within a neighborhood or several square miles in a rural environment, thereby leading to improved signaling, incremental capacity growth, richer user experience, and so on.

Returning to FIG. 1, the wireless link 130 used by the operator A system 100 and the wireless link 132 used by the operator B system 150 may operate over a shared communication medium 140. A communication medium of this type may be composed of one or more frequency, time, and/or space communication resources (e.g., encompassing one or more channels across one or more carriers). As an example, the communication medium 140 may correspond to at least a portion of an unlicensed or lightly licensed frequency band. Although different licensed frequency bands have been reserved for certain communications (e.g., by a government entity such as the Federal Communications Commission (FCC) in the United States), some systems, in particular those employing small cell access points, have extended operation into unlicensed and lightly licensed frequency bands such as the Unlicensed National Information Infrastructure (U-NII) band and the Citizens Broadband (CB) Radio Service band.

Due to the shared use of the communication medium 140, there is the potential for cross-link interference between the wireless link 130 and the wireless link 132. Further, some RATs and some jurisdictions may require contention or "Listen Before Talk (LBT)" for arbitrating access to the communication medium 140. As an example, a Clear Channel Assessment (CCA) protocol may be used in which each device verifies via medium sensing the absence of other traffic on a shared communication medium before seizing (and in some cases reserving) the communication medium for its own transmissions. In some designs, the CCA protocol may include distinct CCA Preamble Detection (CCA-PD) and CCA Energy Detection (CCA-ED) mechanisms for yielding the communication medium to intra-RAT and inter-RAT traffic, respectively. The European Telecommunications Standards Institute (ETSI), for example, mandates contention for all devices regardless of their RAT on certain communication media such as unlicensed frequency bands.

Each of these detection mechanisms as conventionally employed may lead to sub-optimal silencing of neighboring devices, however, and thereby result in inefficient resource reuse. For example, a conventional Wi-Fi CCA-ED mechanism, where devices receiving signaling energy above a threshold refrain from transmitting, may lead to over-silencing or under-silencing depending on the choice of threshold and each device's relative position. Non-homogeneous transmission powers in the network can also result in unfair channel access by high power devices. This mechanism is also subject to the so-called "hidden node" problem. Meanwhile, a conventional Wi-Fi CCA-PD mechanism, where a preamble is transmitted before data transmission and devices that are able to decode the preamble message refrain from transmitting (e.g., for a duration specified in the received preamble), may have a larger coverage area and therefore lead to over-silencing of devices that are not causing interference. The hidden node problem can arise here as well if only the transmitting device sends out the preamble.

As will be described in more detail below, the access point 110 and/or the access terminal 120 may be variously configured in accordance with the teachings herein to provide or otherwise support the "directed" preamble design discussed briefly above. For example, the access point 110 may include a preamble manager 112 and the access terminal 120 may include a preamble manager 122. The preamble manager 112 and/or the preamble manager 122 may be configured in different ways to manage transmission on and access to the communication medium 140.

Figure 2:
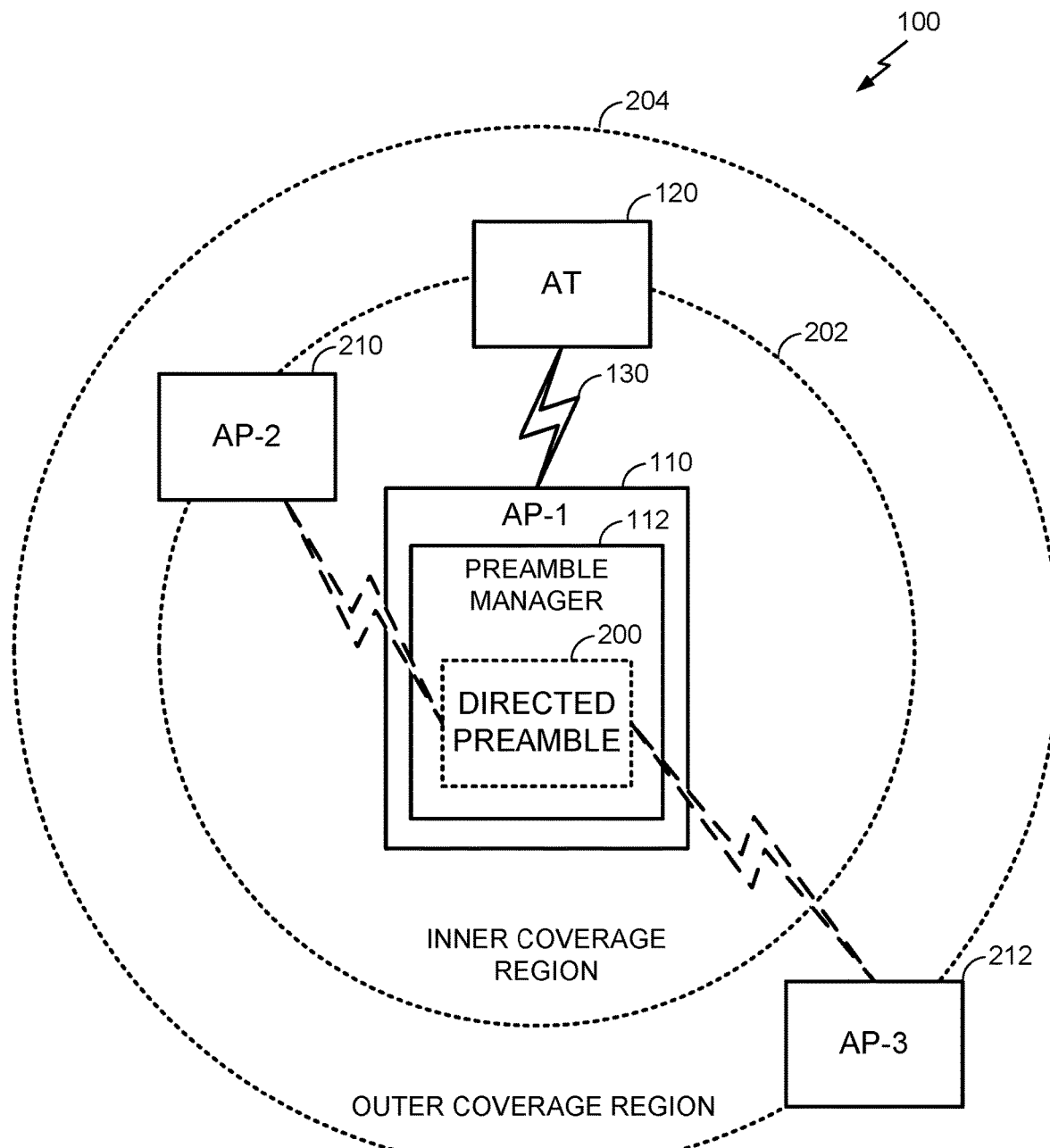
FIG. 2 is an expanded system-level diagram illustrating the use of a directed preamble.

FIG. 2 is an expanded system-level diagram illustrating the use of a directed preamble 200 within the first operator A system 100. In this example, the serving access point 110 (designated as AP-1) serving the access terminal 120 via the communication link 130 is operating in the vicinity of two other neighboring access points, including a second access point 210 (designated as AP-2) and a third access point 212 (designated as AP-3). For illustration purposes, the second access point 210 is shown as operating within an inner coverage region 202 of the serving access point 110, near the access terminal 120, and the third access point 212 is shown as operating within an outer coverage region 204 of the serving access point 110, farther away from the access terminal 120. It will also be appreciated that the transmission of the directed preamble 200 from one access point to another is shown for illustration purposes only, and that in general, the directed preamble 200 may be sent from any device (including, for example, the access terminal 120) to any other neighboring device.

Prior to a data exchange with the access terminal 120, the serving access point 110 may seize the communication medium 140 and transmit the directed preamble 200 as an indication that the communication medium 140 is occupied. In contrast to a conventional preamble that silences all neighboring devices able to decode it, the directed preamble 200 specifically identifies, either explicitly or implicitly, one or more target devices for silencing. For example, the directed preamble 200 may identify the second access point 210 but not the third access point 212. In this way, the second access point 210 nearer the access terminal 120 may be silenced to reduce interference with the access terminal 120 while the third access point 212 may be allowed to transmit concurrently to improve resource reuse and efficiency.

Figure 3:
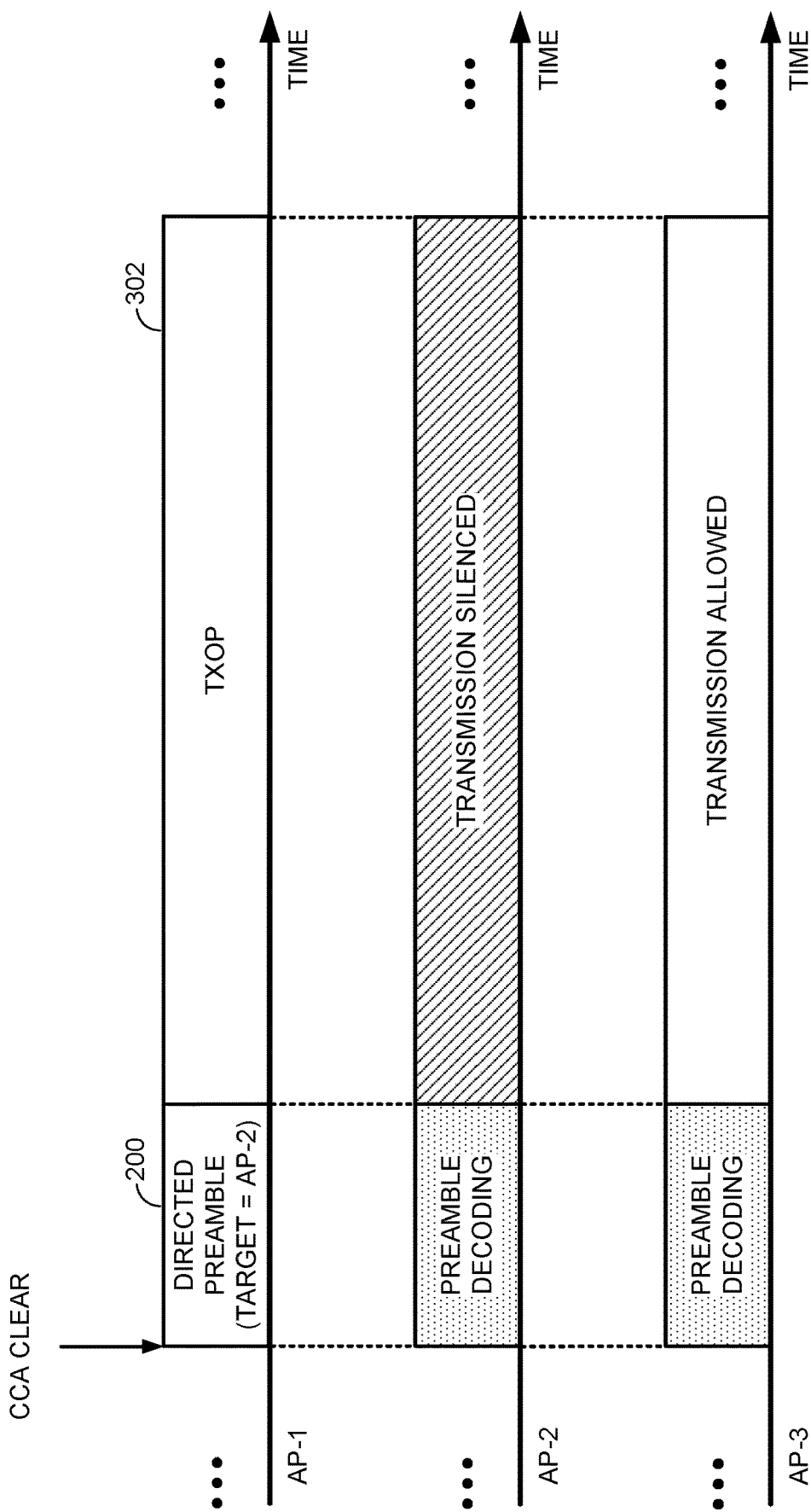
FIG. 3 is a timing diagram illustrating operation of the directed preamble.

FIG. 3 is a timing diagram illustrating operation of the directed preamble 200 within the example environment and scenario of FIG. 2. As shown, once the communication medium 140 becomes clear (e.g., CCA Clear), the serving access point 110 seizes it and transmits the directed preamble 200, which the second access point 210 and the third access point 212 each attempt to decode. Continuing with the example above, the directed preamble 200 identifies the second access point 210 ('Target=AP-2') but not the third access point 212. Accordingly, for the duration of a corresponding transmission opportunity (TXOP) 302, the second access point 210 is silenced and refrains from transmitting. The third access point 212, however, upon determining that it is not identified by the directed preamble 200, is free to transmit concurrently.

Returning to FIG. 2, in general, the set of devices targeted for silencing may be selected, either explicitly or implicitly, based on conditions associated with the access terminal being served. In the example above, if the second access point 210 causes interference at the access terminal 120 that is above a threshold, the second access point 210 may be targeted for silencing by the directed preamble 200. Similarly, if the second access point 210 causes the signal-to-interference-plus-noise ratio (SINR) at the access terminal 120 to drop below a threshold, the second access point 210 may be targeted for silencing by the directed preamble 200. The identity of interfering devices such as the second access point 210 and any other pertinent information (e.g., received signal strength) may be signaled to the serving access point 110 by the access terminal 120 (e.g., via the communication link 130).

Figure 4:
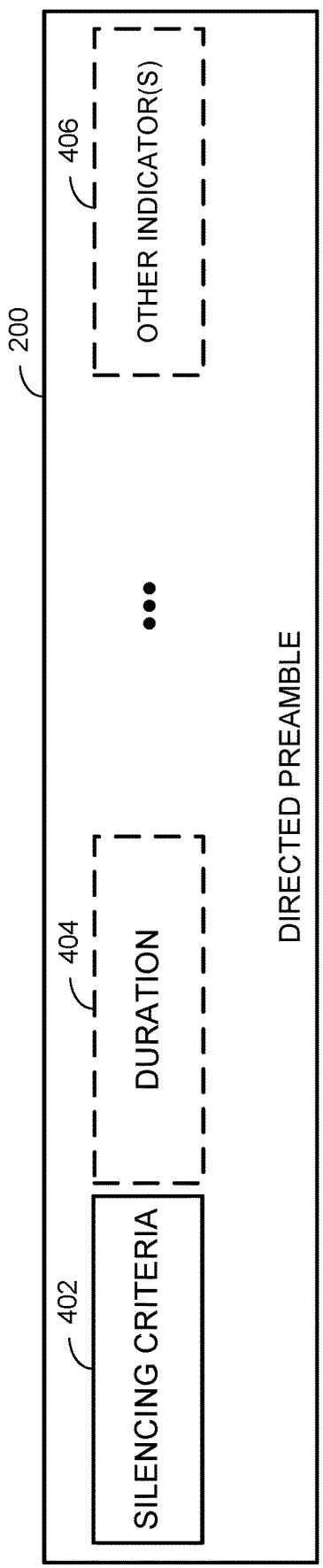
FIG. 4 illustrates an example implementation of the directed preamble.

FIG. 4 illustrates an example implementation of the directed preamble 200. In this example, the directed preamble 200 includes, in relevant part, a silencing criteria indicator 402, an (optional) duration indicator 404, and any other indicator(s) 406 as appropriate for a given implementation. It will be appreciated that the single directed preamble 200 is shown for illustration purposes only, and that in different designs and scenarios the various indicators may be transmitted (broadcasted or unicasted) in different sets of signals, as separate individual signals, and so on, or may be omitted entirely, as appropriate.

The silencing criteria indicator 402 may be used to identify one or more devices targeted for silencing as discussed above. For example, the silencing criteria indicator 402 may include one or more device identifiers that explicitly indicate the identity of a target device. Each identifier may include, for example, a physical cell identifier (PCI), a medium access control (MAC) identifier, or any other identifier that uniquely or at least semi-uniquely identifies the target device. In case the number of devices that needs to be silenced is larger than what the directed preamble 200 can carry, the device identifier may include a predefined broadcast address, a group identifier (e.g., corresponding to a predefined group of devices), or the like to indicate that all neighboring devices should silence transmission. As another example, the silencing criteria indicator 402 may include a protected device identity (e.g., corresponding to the access terminal 120) and an associated interference level tolerance threshold that implicitly indicates the identity of a target device with respect to the interference the target device may be causing to the protected device. Any device receiving the directed preamble 200 may compare the interference level tolerance threshold to an uplink signaling history of the protected device or the like (as monitored and stored at the receiving device), such that devices receiving the directed preamble 200 while observing that they are causing interference to the protected device at an intolerable level will silence transmission, and other devices will not. In general, any criterion that allows neighboring devices to be selectively silenced may be employed.

The (optional) duration indicator 404 may be used to indicate the duration of transmission (e.g., the length of the TXOP 302). The other (optional) indicator(s) 406 may be used to indicate any other information as desired, such as a reference signal for channel estimation, quality of service, priority, and so on. For improved co-existence with the second operator B system 150 (e.g., Wi-Fi), the directed preamble 200 may also be formatted as or combined with a corresponding preamble of that system.

In some designs, the directed preamble 200 and associated processing may be configured for detection and decoding at substantially low SNRs (e.g., −6 dB), which may help to address the hidden node problem discussed above. To improve detection and decoding, transmit diversity may be employed, the integration time at the target device may be increased, and so on. One way to increase the integration time is by defining a new and longer slot duration for channel sensing (e.g., greater than the conventional 9 μs defined for Wi-Fi), at least for processing at lower SNRs. This longer duration allows the target device to collect more samples and make a more reliable determination as to whether signaling is present on the communication medium 140. In addition or as an alternative, two or more normal slots may be combined to form one, effectively longer slot duration for detection purposes without changing the network parameters (e.g., by the target device choosing its backoff counter from only even numbers). Further, multiple integration windows of different lengths may be defined for detection under different scenarios, such as a shorter window for early detection of high SNR preambles and a longer window for detection of low SNR preambles not identified with the shorter window. Still further, the detection threshold may be adjusted in the last slot where channel sensing occurs prior to transmission (e.g., when the backoff counter=1) to increase sensitivity to lower SNR preambles, which can be combined with the multiple integration windows discussed above.

Figure 5:
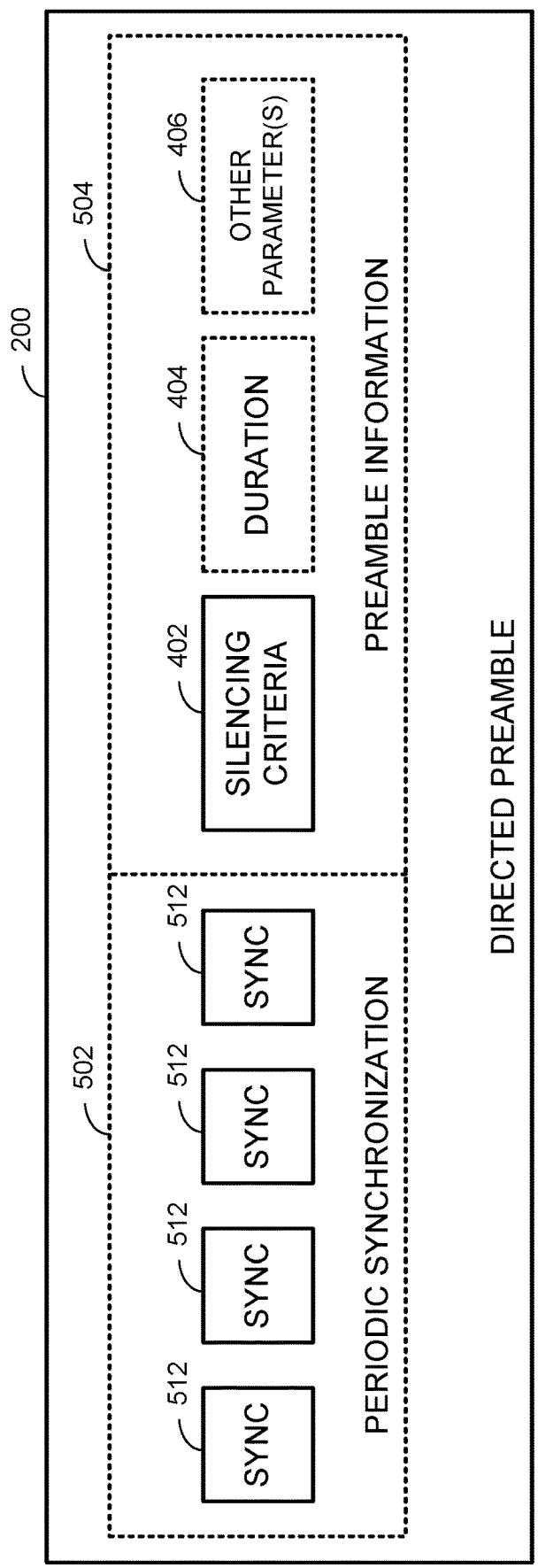
FIG. 5 illustrates another example implementation of the directed preamble.

FIG. 5 illustrates another example implementation of the directed preamble 200. In this example, the directed preamble 200 is generally divided into two portions, shown for illustration purposes as a first, periodic synchronization portion 502 and a second, preamble information portion 504.

The periodic synchronization portion 502 may be used to facilitate detection and time synchronization. As shown, it may include a series of synchronization signals 512, with four instances being shown for illustration purposes. The length and number of repetitions of the synchronization signals 512 may be selected to satisfy system requirements such as automatic gain control (AGC) convergence time, LBT parameters, receiver sensitivity to the preamble, etc. In general, however, the periodic synchronization portion 502 may be substantially less than one symbol period (e.g., less than one LTE OFDM symbol). Moreover, its waveform may not follow the primary RAT structure, while still being suitable for transmission (e.g., by a primary RAT transceiver of the access point 110).

The preamble information portion 504 may be substantially longer, composed of one or more symbol periods, and include the silencing criteria indicator 402, the (optional) duration indicator 404, and the other (optional) indicator(s) 406 discussed in more detail above with reference to FIG. 4.

Figure 6:
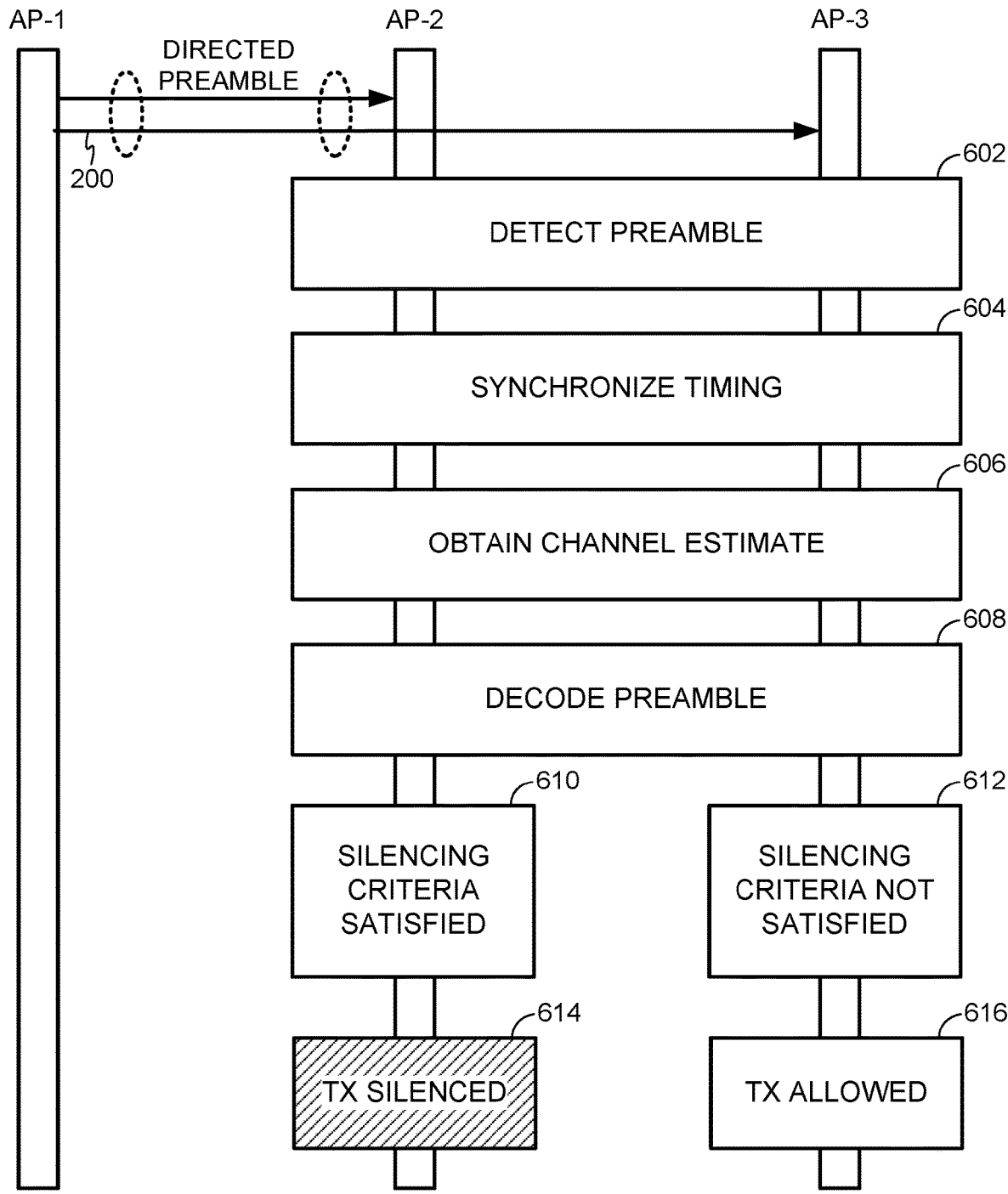
FIG. 6 is a signaling flow diagram illustrating additional aspects of directed preamble processing.

FIG. 6 is a signaling flow diagram illustrating additional aspects of directed preamble processing using the directed preamble design of FIG. 5 within the example environment and scenario of FIG. 2. In this example, the serving access point 110 (AP-1) again transmits the directed preamble 200 within range of the second access point 210 (AP-2) and the third access point 212 (AP-3).

While monitoring the communication medium 140, the second access point 210 and the third access point 212 may detect the presence of the directed preamble 200 (block 602). This can be done by auto-correlation or cross correlation of the received signals in the periodic synchronization portion 502, depending on SINR, integration window length, channel type, etc. Once detected, the second access point 210 and the third access point 212 may synchronize their timing with the received signals in the periodic synchronization portion 502 (block 604).

The second access point 210 and the third access point 212 may then utilize the preamble information portion 504 of the directed preamble 200 to obtain a channel estimate (block 606). Based on the channel estimate, the second access point 210 and the third access point 212 may decode the remainder of the directed preamble 200 (block 608).

Once decoded, the second access point 210 and the third access point 212 may check to see whether they are each identified for silencing by the directed preamble 200. Continuing the example of FIG. 2 above, the second access point 210 may determine that it satisfies the silencing criteria included in the directed preamble 200 (block 610), and the third access point 212 may determine that it does not satisfy the silencing criteria included in the directed preamble 200 (block 612). For example, the second access point 210 may determine that there is a match between its identifier and an identifier included in the directed preamble 200, either individually or via inclusion of the broadcast address or group identifier including the second access point 210, and the third access point 212 may determine that there is no match between its identifier and an identifier included in the directed preamble 200, again individually and via absence of the broadcast address or group identifier including the third access point 212. As another example, the second access point 210 may determine that it has received the directed preamble 200 while observing that it is causing a level of interference to the access terminal 120 that is above an interference level tolerance threshold included in the directed preamble 200, and the third access point 212 may determine that it has received the directed preamble 200 while observing that it is not causing a level of interference to the access terminal 120 that is above the interference level tolerance threshold included in the directed preamble 200. In either case, transmission may be silenced at the second access point 210 (block 614) and allowed at the third access point 212 (block 616).

Figure 7:
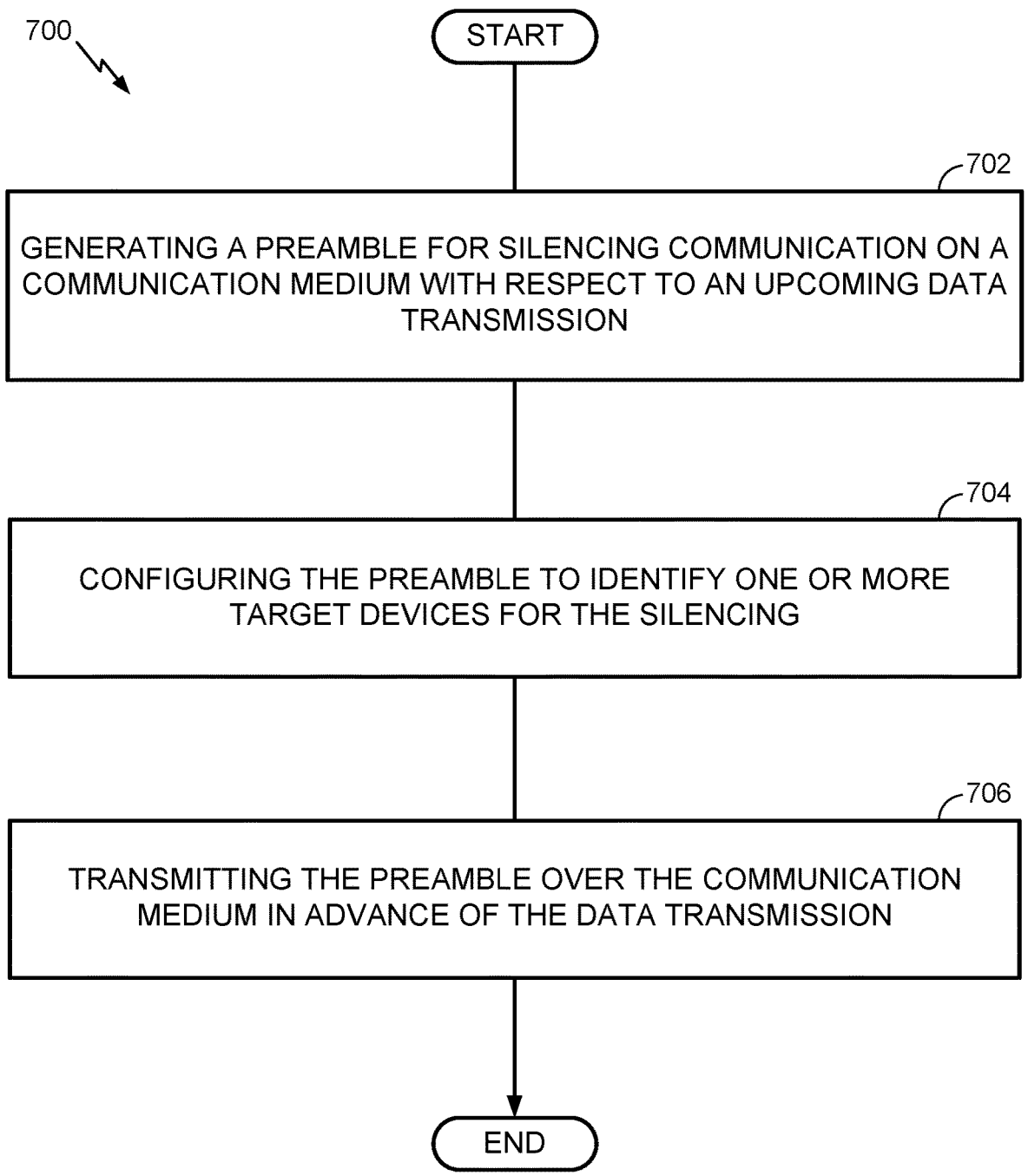
FIG. 7 is a flow diagram illustrating an example method of communication in accordance with the techniques described herein.

FIG. 7 is a flow diagram illustrating an example method of communication in accordance with the techniques described above. The method 700 may be performed, for example, by an access point or an access terminal (e.g., the access point 110 or the access terminal 120 illustrated in FIG. 1) operating on a shared communication medium. As an example, the communication medium may include one or more time, frequency, or space resources on an unlicensed radio frequency band shared between LTE technology and Wi-Fi technology devices.

As shown, the access point or the access terminal may generate a preamble for silencing communication on a communication medium with respect to an upcoming data transmission (block 702). The access point or the access terminal may then configure the preamble to identify one or more target devices for the silencing (block 704) and transmit the preamble over the communication medium in advance of the data transmission (block 706).

As discussed in more detail above, the preamble may be configured, for example, to include one or more silencing criteria for identifying the one or more target devices. As an example, the one or more silencing criteria may include a device identifier associated with at least one of the one or more target devices. In some instances, the device identifier may correspond to a broadcast address or a group identifier associated with a plurality of the one or more target devices. As another example, the one or more silencing criteria may include a protected device identity and an associated interference level tolerance threshold.

As also discussed in more detail above, the access point or the access terminal may select the one or more target devices based on one or more signaling conditions for the data transmission. As an example, the one or more signaling conditions may comprise an interference above a threshold at a receiving device, a SINR drop below a threshold at the receiving device, or a combination thereof.

In some designs or scenarios, the preamble may be further configured to include a duration indicator that indicates a duration of the data transmission. The preamble may also be further configured to include a series of synchronization signals. Following the transmission of the preamble (block 706), the access point or the access terminal may transmit or receive the data transmission over the communication medium.

Figure 8:
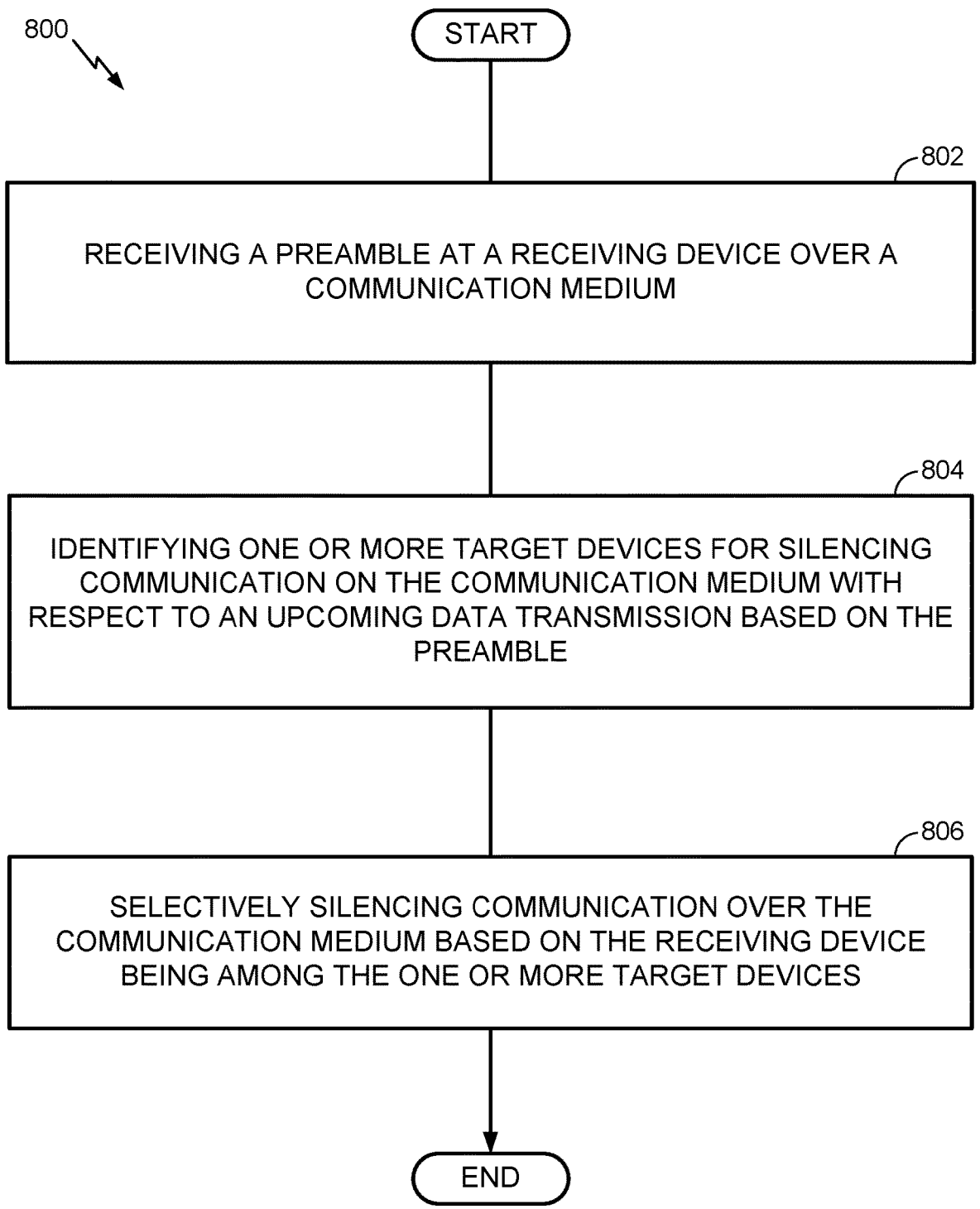
FIG. 8 is a flow diagram illustrating another example method of communication in accordance with the techniques described herein.

FIG. 8 is a flow diagram illustrating another example method of communication in accordance with the techniques described above. The method 800 may again be performed, for example, by an access point or an access terminal (e.g., the access point 110 or the access terminal 120 illustrated in FIG. 1) operating on a shared communication medium. As an example, the communication medium may include one or more time, frequency, or space resources on an unlicensed radio frequency band shared between LTE technology and Wi-Fi technology devices.

As shown, the access point or the access terminal may receive a preamble (as a receiving device) over a communication medium (block 802). The access point or the access terminal may then identify one or more target devices for silencing communication on the communication medium with respect to an upcoming data transmission based on the preamble (block 804) and selectively silence communication over the communication medium based on itself (as the receiving device) being among the one or more target devices (block 806).

As discussed in more detail above, the identifying (block 804) may comprise, for example, evaluating one or more silencing criteria included in the preamble. As an example, the access point or the access terminal may compare a device identifier included in the one or more silencing criteria against a device identifier associated with itself (as the receiving device). As another example, the access point or the access terminal may compare a protected device identity and an associated interference level tolerance threshold included in the one or more silencing criteria against an uplink signaling history of the protected device.

In some designs or scenarios, the access point or the access terminal may synchronize timing with the preamble based on a series of synchronization signals included in the preamble.

For generality, the access point 110 and the access terminal 120 are shown in FIG. 1 only in relevant part as including the preamble manager 112 and the preamble manager 122, respectively. It will be appreciated, however, that the access point 110 and the access terminal 120 may be configured in various ways to provide or otherwise support the preamble signaling techniques discussed herein.

Figure 9:
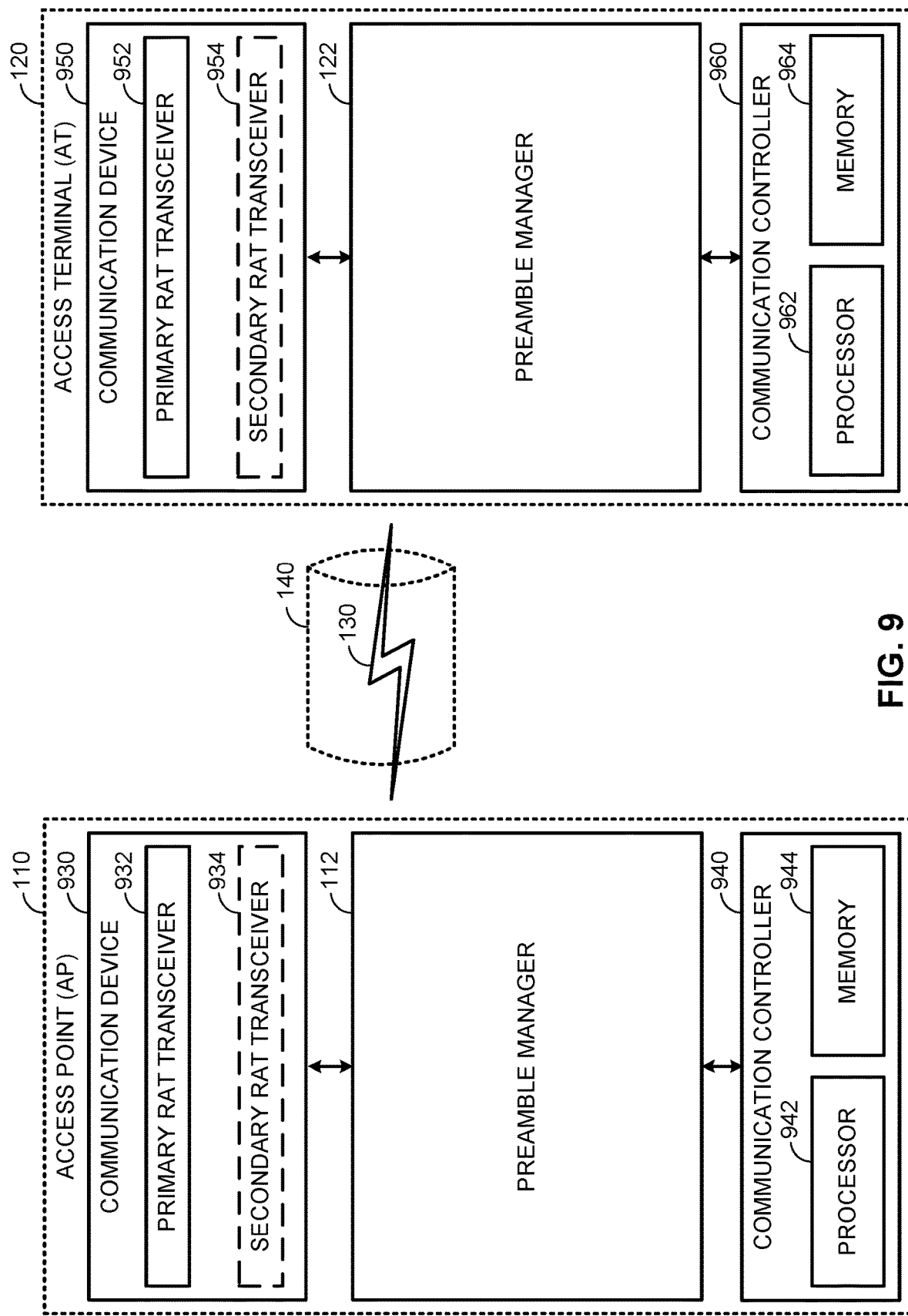
FIG. 9 is a device-level diagram illustrating example components of an access point and an access terminal in more detail.

FIG. 9 is a device-level diagram illustrating example components of the access point 110 and the access terminal 120 in more detail. As shown, the access point 110 and the access terminal 120 may each generally include a wireless communication device (represented by the communication devices 930 and 950) for communicating with other wireless nodes via at least one designated RAT. The communication devices 930 and 950 may be variously configured for transmitting and encoding signals, and, conversely, for receiving and decoding signals in accordance with the designated RAT (e.g., messages, indications, information, pilots, and so on).

The communication devices 930 and 950 may include, for example, one or more transceivers, such as respective primary RAT transceivers 932 and 952, and, in some designs, (optional) co-located secondary RAT transceivers 934 and 954, respectively (corresponding, for example, to the RAT employed by the operator B system 150, if different than the operator A system 100). As used herein, a "transceiver" may include a transmitter circuit, a receiver circuit, or a combination thereof, but need not provide both transmit and receive functionalities in all designs. For example, a low functionality receiver circuit may be employed in some designs to reduce costs when providing full communication is not necessary (e.g., a radio chip or similar circuitry providing low-level sniffing only). Further, as used herein, the term "co-located" (e.g., radios, access points, transceivers, etc.) may refer to one of various arrangements. For example, components that are in the same housing; components that are hosted by the same processor; components that are within a defined distance of one another; and/or components that are connected via an interface (e.g., an Ethernet switch) where the interface meets the latency requirements of any required inter-component communication (e.g., messaging).

The access point 110 and the access terminal 120 may also each generally include a communication controller (represented by the communication controllers 940 and 960) for controlling operation of their respective communication devices 930 and 950 (e.g., directing, modifying, enabling, disabling, etc.). The communication controllers 940 and 960 may include one or more processors 942 and 962, and one or more memories 944 and 964 coupled to the processors 942 and 962, respectively. The memories 944 and 964 may be configured to store data, instructions, or a combination thereof, either as on-board cache memory, as separate components, a combination, etc. The processors 942 and 962 and the memories 944 and 964 may be standalone communication components or may be part of the respective host system functionality of the access point 110 and the access terminal 120.

It will be appreciated that the preamble manager 112 and the preamble manager 122 may be implemented in different ways. In some designs, some or all of the functionality associated therewith may be implemented by or otherwise at the direction of at least one processor (e.g., one or more of the processors 942 and/or one or more of the processors 962), at least one memory (e.g., one or more of the memories 944 and/or one or more of the memories 964), at least one transceiver (e.g., one or more of the transceivers 932 and 934 and/or one or more of the transceivers 952 and 954), or a combination thereof. In other designs, some or all of the functionality associated therewith may be implemented as a series of interrelated functional modules.

Accordingly, it will be appreciated that the components in FIG. 9 may be used to perform operations described above with respect to FIGS. 1-8. For example, the access point 110 may, via the processor 942 and the memory 944, generate a preamble for silencing communication on the communication medium 140 with respect to an upcoming data transmission. The access point 110 may also, via the processor 942 and the memory 944, configure the preamble to identify one or more target devices for the silencing. The access point 110 may then, via the primary RAT transceiver 932, transmit the preamble over the communication medium 140 in advance of the data transmission. Similarly, the access terminal 120 may, via the processor 962 and the memory 964, generate a preamble for silencing communication on the communication medium 140 with respect to an upcoming data transmission. The access terminal 120 may also, via the processor 962 and the memory 964, configure the preamble to identify one or more target devices for the silencing. The access terminal 120 may then, via the primary RAT transceiver 952, transmit the preamble over the communication medium 140 in advance of the data transmission.

As another example, the access point 110 may, via the primary RAT transceiver 932, receive a preamble (as a receiving device) over the communication medium 140. The access point 110 may then, via the processor 942 and the memory 944, identify one or more target devices for silencing communication on the communication medium 140 with respect to an upcoming data transmission based on the preamble. The access point 110 may then, via the processor 942 and the memory 944, selectively silence communication over the communication medium 140 based on itself (as the receiving device) being among the one or more target devices. Similarly, the access terminal 120 may, via the primary RAT transceiver 952, receive a preamble (as a receiving device) over the communication medium 140. The access terminal 120 may then, via the processor 962 and the memory 964, identify one or more target devices for silencing communication on the communication medium 140 with respect to an upcoming data transmission based on the preamble. The access terminal 120 may then, via the processor 962 and the memory 964, selectively silence communication over the communication medium 140 based on itself (as the receiving device) being among the one or more target devices.

Figure 10:
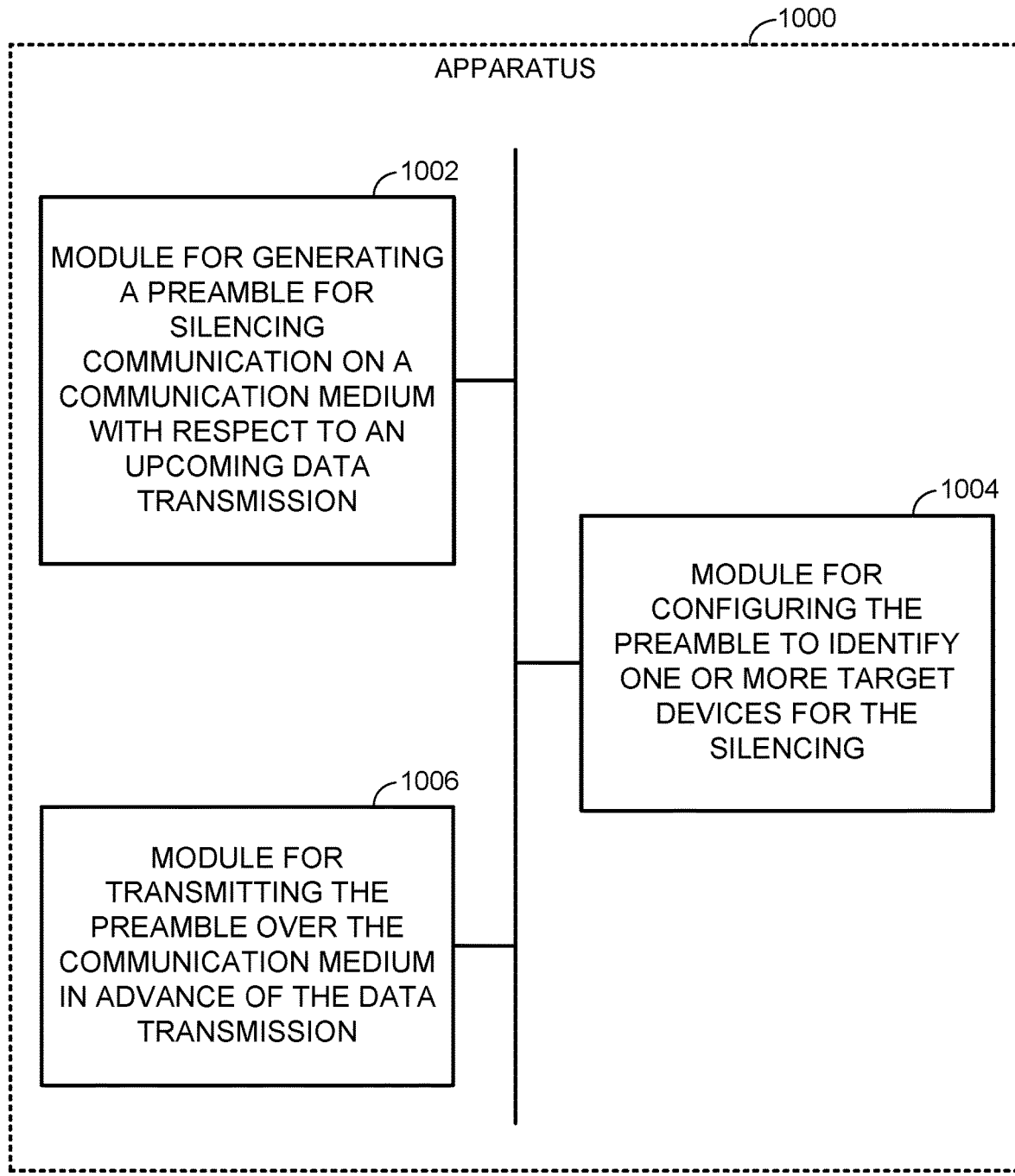
FIG. 10 illustrates an example apparatus represented as a series of interrelated functional modules.

FIG. 10 illustrates an example apparatus for implementing the preamble manager 112 and/or the preamble manager 122 represented as a series of interrelated functional modules. In the illustrated example, the apparatus 1000 includes a module for generating 1002, a module for configuring 1004, and a module for transmitting 1006.

The module for generating 1002 may be configured to generate a preamble for silencing communication on a communication medium with respect to an upcoming data transmission. The module for configuring 1004 may be configured to configure the preamble to identify one or more target devices for the silencing. The module for transmitting 1006 may be configured to transmit the preamble over the communication medium in advance of the data transmission.

As discussed in more detail above, the preamble may be configured, for example, to include one or more silencing criteria for identifying the one or more target devices. As an example, the one or more silencing criteria may include a device identifier associated with at least one of the one or more target devices. In some instances, the device identifier may correspond to a broadcast address or a group identifier associated with a plurality of the one or more target devices. As another example, the one or more silencing criteria may include a protected device identity and an associated interference level tolerance threshold.

As also discussed in more detail above, the one or more target devices may be selected based on one or more signaling conditions for the data transmission. As an example, the one or more signaling conditions may comprise an interference above a threshold at a receiving device, a SINR drop below a threshold at the receiving device, or a combination thereof.

In some designs or scenarios, the preamble may also be configured to include a duration indicator that indicates a duration of the data transmission. The preamble may also be configured to include a series of synchronization signals. Following the transmission of the preamble, the data transmission may be transmitted or received over the communication medium.

Figure 11:
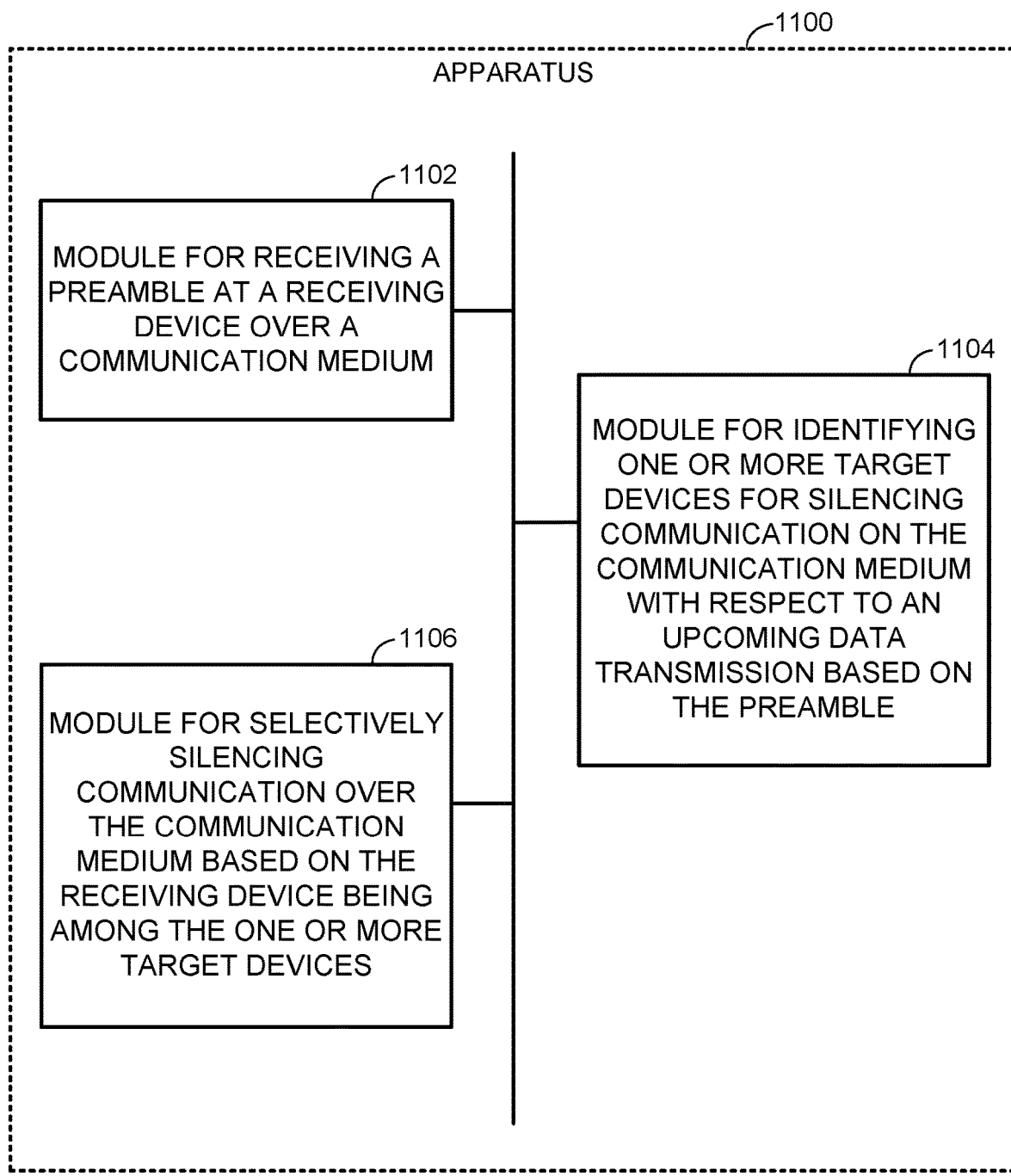
FIG. 11 illustrates another example apparatus represented as a series of interrelated functional modules.

FIG. 11 illustrates an example apparatus for implementing the preamble manager 112 and/or the preamble manager 122 represented as a series of interrelated functional modules. In the illustrated example, the apparatus 1100 includes a module for receiving 1102, a module for identifying 1104, and a module for selectively silencing 1106.

The module for receiving 1102 may be configured to receive a preamble at the apparatus 1100 (as a receiving device) over a communication medium. The module for identifying 1104 may be configured to identify one or more target devices for silencing communication on the communication medium with respect to an upcoming data transmission based on the preamble. The module for selectively silencing 1106 may be configured to selectively silence communication over the communication medium based on the apparatus 1100 (as the receiving device) being among the one or more target devices.

As discussed in more detail above, one or more silencing criteria included in the preamble may be evaluated to identify the one or more target devices. As an example, a device identifier included in the one or more silencing criteria may be compared against a device identifier associated with the apparatus 1100 (as the receiving device). As another example, a protected device identity and an associated interference level tolerance threshold included in the one or more silencing criteria may be compared against an uplink signaling history of the protected device stored at the apparatus 1100 (as the receiving device).

In some designs or scenarios, timing may be synchronized with the preamble based on a series of synchronization signals included in the preamble.

The functionality of the modules of FIGS. 10-11 may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIGS. 10-11, as well as other components and functions described herein, may be implemented using any suitable means. Such means also may be implemented, at least in part, using corresponding structure as taught herein. For example, the components described above in conjunction with the "module for" components of FIGS. 10-11 also may correspond to similarly designated "means for" functionality. Thus, in some aspects one or more of such means may be implemented using one or more of processor components, integrated circuits, or other suitable structure as taught herein, including as an algorithm. One skilled in the art will recognize in this disclosure an algorithm represented in the prose described above, as well in sequences of actions that may be represented by pseudocode. For example, the components and functions represented by FIGS. 10-11 may include code for performing a LOAD operation, a COMPARE operation, a RETURN operation, an IF-THEN-ELSE loop, and so on.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

In view of the descriptions and explanations above, one skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Accordingly, it will be appreciated, for example, that an apparatus or any component of an apparatus may be configured to (or made operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

Moreover, the methods, sequences, and/or algorithms described in connection with the aspects disclosed herein may be embodied directly in hardware, in a software module executed by a processor, or in a combination of the two. A software module may reside in Random-Access Memory (RAM), flash memory, Read-only Memory (ROM), Erasable Programmable Read-only Memory (EPROM), Electrically Erasable Programmable Read-only Memory (EEPROM), registers, hard disk, a removable disk, a CD-ROM, or any other form of storage medium known in the art, transitory or non-transitory. An exemplary storage medium is coupled to the processor such that the processor can read information from, and write information to, the storage medium. In the alternative, the storage medium may be integral to the processor (e.g., cache memory).

Accordingly, it will also be appreciated, for example, that certain aspects of the disclosure can include a transitory or non-transitory computer-readable medium embodying a method for communication.

While the foregoing disclosure shows various illustrative aspects, it should be noted that various changes and modifications may be made to the illustrated examples without departing from the scope defined by the appended claims. The present disclosure is not intended to be limited to the specifically illustrated examples alone. For example, unless otherwise noted, the functions, steps, and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. A communication method, comprising: generating, at an access point, a preamble for silencing communication on a communication medium with respect to an upcoming data transmission; configuring the preamble to identify one or more target devices for the silencing by including one or more silencing criteria including a protected device identity and an associated interference level tolerance threshold to enable a device receiving the preamble to silence itself if the device receiving the preamble determines that it is among the one or more target devices due to causing interference to the protected device by comparing the interference level tolerance threshold to an uplink signaling history of the protected device stored at the one or more target devices and identified by the protected device identity; and transmitting the preamble over the communication medium in advance of the upcoming data transmission.

2. The method of claim 1, wherein the protected device identity corresponds to an access terminal.

3. The method of claim 1, wherein the one or more silencing criteria further include a device identifier associated with at least one of the one or more target devices.

4. The method of claim 3, wherein the device identifier corresponds to a broadcast address or a group identifier associated with a plurality of the one or more target devices.

5. The method of claim 1, further comprising configuring the preamble to include a duration indicator that indicates a duration of the upcoming data transmission.

6. The method of claim 1, the one or more silencing criteria further comprising one or more signaling conditions for the upcoming data transmission.

7. The method of claim 6, wherein the one or more signaling conditions for the upcoming data transmission comprise one or more signaling conditions at the device receiving the preamble.

8. The method of claim 6, wherein the one or more signaling conditions comprise an interference above a threshold at the device receiving the preamble, a signal-to-interference-plus-noise ratio (SINR) drop below a threshold at the device receiving the preamble, or a combination thereof.

9. The method of claim 1, further comprising configuring the preamble to include a series of synchronization signals.

10. A communication apparatus, comprising: at least one processor; at least one memory coupled to the at least one processor, the at least one processor and the at least one memory being configured to: generate, at an access point, a preamble for silencing communication on a communication medium with respect to an upcoming data transmission, and configure the preamble to identify one or more target devices for the silencing by including one or more silencing criteria including a protected device identity and an associated interference level tolerance threshold to enable a device receiving the preamble to silence itself if the device receiving the preamble determines that it is among the one or more target devices due to causing interference to the protected device by comparing the interference level tolerance threshold to an uplink signaling history of the protected device stored at the one or more target devices, and identified by the protected device identity; and at least one transceiver configured to transmit the preamble over the communication medium in advance of the upcoming data transmission.

11. The apparatus of claim 10, wherein the protected device identity corresponds to an access terminal.

12. The apparatus of claim 10, wherein the one or more silencing criteria further include a device identifier associated with at least one of the one or more target devices.

13. The apparatus of claim 12, wherein the device identifier corresponds to a broadcast address or a group identifier associated with a plurality of the one or more target devices.

14. The apparatus of claim 10, wherein the at least one processor and the at least one memory are further configured to configure the preamble to include a duration indicator that indicates a duration of the upcoming data transmission.

15. The apparatus of claim 10, wherein the one or more silencing criteria further comprise one or more signaling conditions for the upcoming data transmission.

16. The apparatus of claim 15, wherein the one or more signaling conditions comprise an interference above a threshold at the device receiving the preamble, a signal-to-interference-plus-noise ratio (SINR) drop below a threshold at the device receiving the preamble, or a combination thereof.

17. The apparatus of claim 10, wherein the at least one processor and the at least one memory are further configured to configure the preamble to include a series of synchronization signals.

18. The apparatus of claim 10, wherein the at least one transceiver is further configured to transmit or receive the upcoming data transmission over the communication medium following the transmission of the preamble.

19. A communication method, comprising: receiving a preamble at a receiving device over a communication medium, the preamble including one or more silencing criteria including a protected device identity and an associated interference level tolerance threshold; identifying at the receiving device whether the receiving device is among one or more target devices for silencing communication on the communication medium with respect to an upcoming data transmission based on a determination by the receiving device using the one or more silencing criteria that the receiving device is causing interference to the protected device associated with the protected device identity, the determination comprising comparing the interference level tolerance threshold to an uplink signaling history of the protected device stored at the one or more target devices and identified by the protected device identity; and selectively silencing communication over the communication medium based on the receiving device being among the one or more target devices.

20. The method of claim 19, wherein the evaluating comprises comparing a device identifier included in the one or more silencing criteria against a device identifier associated with the receiving device.

21. The method of claim 19, wherein the receiving comprises synchronizing timing with the preamble based on a series of synchronization signals included in the preamble.

22. A communication apparatus, comprising: at least one transceiver configured to receive a preamble at a receiving device over a communication medium, the preamble including one or more silencing criteria including a protected device identity and an associated interference level tolerance threshold; at least one processor; and at least one memory coupled to the at least one processor, the at least one processor and the at least one memory being configured to: identify at the receiving device whether the receiving device is among one or more target devices for silencing communication on the communication medium with respect to an upcoming data transmission based on a determination by the receiving device using the one or more silencing criteria that the receiving device is causing interference to the protected device associated with the protected device identity, the determination comprising comparing the interference level tolerance threshold to an uplink signaling history of the protected device stored at the one or more target devices and identified by the protected device identity, and selectively silence communication over the communication medium based on the receiving device being among the one or more target devices.

23. The apparatus of claim 22, wherein the at least one processor and the at least one memory are configured to compare a device identifier included in the one or more silencing criteria against a device identifier associated with the receiving device.

24. The apparatus of claim 22, wherein the at least one transceiver is further configured to synchronize timing with the preamble based on a series of synchronization signals included in the preamble.

* * * * *